United States Patent Office 3,522,278
Patented July 28, 1970

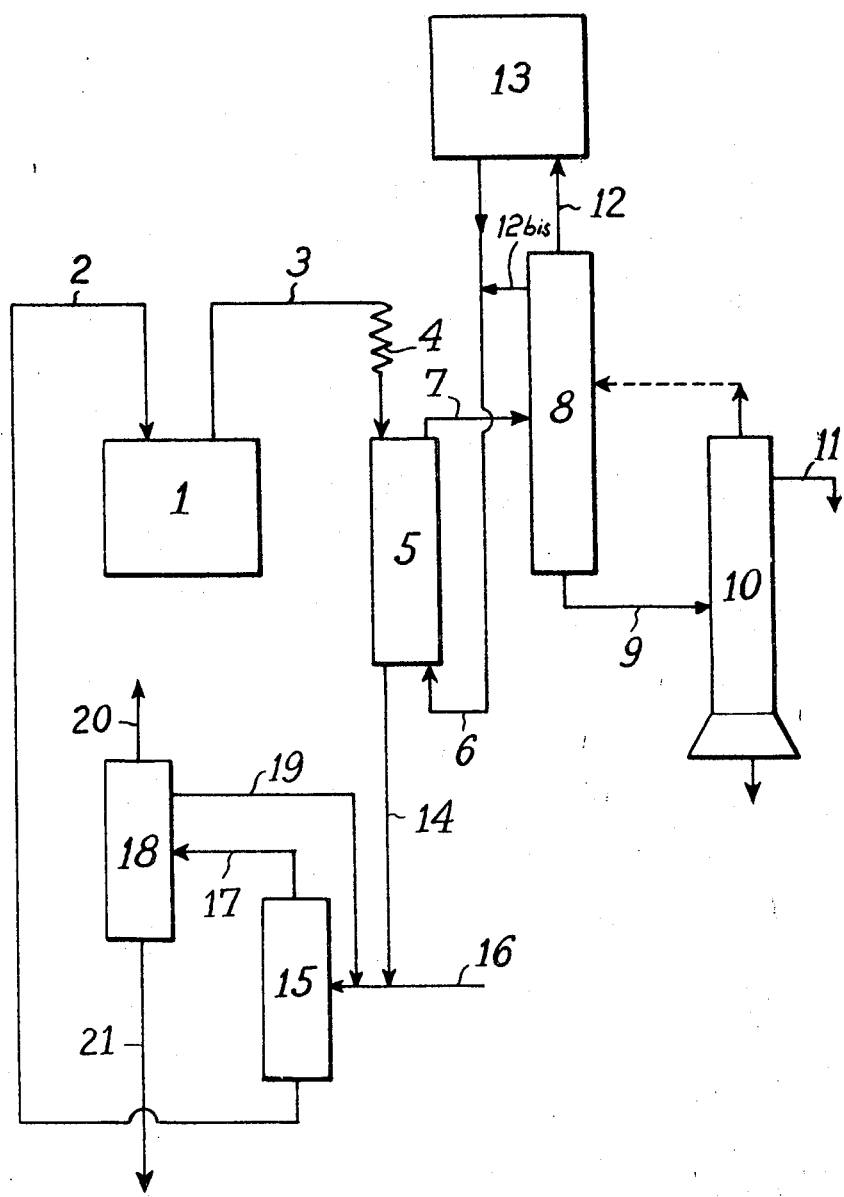

3,522,278
PROCESS FOR THE PREPARATION OF TRIOXANE
Henri Montaubric, Bully les Mines, and Eugène Gombar, Mazingarbe, France, assignors to Houilleres du Bassin du Nord & du Pas-de-Calais, Foulons, Douai, Nord, France, a French public establishment
Filed July 26, 1966, Ser. No. 568,045
Claims priority, application France, July 28, 1965, 26,366
Int. Cl. C07d *19/00*
U.S. Cl. 260—340                                 1 Claim

ABSTRACT OF THE DISCLOSURE

The continuous production of trioxane by heating a concentrated aqueous solution of formaldehyde with a strongly acid catalyst under distillation conditions followed by extraction of the resulting trioxane with a water immiscible solvent, here involves the maintenance of a formic acid content in the initial solution of from 3 to 10% by weight, and the use of benzene as the extracting solvent in a ratio with the distillate of from 0.3:1 to 2:1, the extraction of the trioxane being accompanied by the extraction of a minor amount of formic acid which is separated from the trioxane in the form of an azeotropic mixture with the benzene when the latter is distilled off, and the unextracted but distilled formaldehyde and formic acid is concentrated and recycled in the process.

---

The invention relates to an improved process for the preparation of trioxane.

1,3,5-trioxane, which is a cyclic trimer of formaldehyde, can of course be obtained by the following steps: heating a concentrated aqueous solution of formaldehyde in the presence of a strongly acid catalyst; continuously distilling the resulting trioxane in the form of a mixture which is azeotropic with water (boiling between 90° and 92° C.); extracting the trioxane from the distillate by a solvent which is immiscible with water; and separating the trioxane from the extract by distillation.

However, the heating of a concentrated aqueous solution of formaldehyde in the presence of a strongly acid catalyst also produces considerable quantities of formic acid which distil out simultaneously with the azeotropic mixture of trioxane and water and the unreacted formaldehyde. The formic acid must therefore be eliminated, since excessive contents thereof would accumulate if it was recycled with the unreacted formaldehyde.

The applicants have found that some of the formic acid in the distillate supplied to the extractor can be extracted at the same time as the trioxane, if benzene is used as the trioxane-extracting solvent. The surprising fact is that if a particular content of formic acid is maintained in the charge of concentrated formaldehyde and strongly acid catalyst fed to the reactor, and a particular ratio between trioxane-extracting solvent and distillate is adapted in the extractor, the trioxane-extracting solvent removes a quantity of formic acid equal to that forming in the reactor.

Advantageously, the formic acid content maintained in the charge fed to the reactor is about 3–10%.

The ratio between the trioxane-extracting solvent and the distillate adopted in the extractor is advantageously from about 0.3:1 to 2:1, preferably 1:1.

Benzene is moreover an advantageous trioxane-extracting solvent, since it meets the five following requirements:

(1) It has a boiling temperature lower than that of the water-trioxane azeotrope—i.e., 90–92° C.;

(2) It has an acceptable apportioning coefficient of the trioxane between the organic solvent phase and the aqueous phase;

(3) It forms an azeotrope with formic acid;

(4) It forms with formic acid an azeotrope containing a considerable quantity of formic acid;

(5) It forms with formic acid an azeotrope whose boiling temperature is lower than that of the water-trioxane azeotrope—i.e., 90–92° C.

For purposes of comparison, Table I shows the characteristics of the conventional trioxane-extracting solvents.

TABLE I

| Solvent | Boiling temperature in ° C. | Apportioning coefficient of trioxane: solvent-water | Azeotrope with HCOOH | Boiling temperature of azeotrope with HCOOH | HCOOH content in azeotrope |
|---|---|---|---|---|---|
| Methylene chloride | 40.1 | 4.14 | No | | |
| Chloroform | 61.26 | 3.14 | No | | |
| Carbon tetrachloride | 76.8 | 0.56 | No | | |
| Benzene | 80.1 | 2.08 | Yes | 71.05 | 69 |
| Trichloroethylene | 86.95 | | Yes | 74.1 | 25 |
| 1,2-dichlorothane | 83.7 | 2.58 | Yes | 77.4 | 14 |
| 1,1-dichloroethane | 57.25 | | Yes | 56.0 | 5 |
| 1-bromopropane | 71 | | Yes | 64.7 | 27 |
| 2-bromopropane | 59.35 | | Yes | 56.0 | 14 |
| 1-chloropropane | 46.65 | | Yes | 45.6 | 8 |
| Pentane | 36.15 | 0.28 | Yes | 34.2 | 10 |
| Cyclohexene | 82.75 | 0.55 | Yes | 71.5 | 69 |
| 1,3-cyclohexadiene | 80.8 | | Yes | 71 | 70 |
| 1,3-hexadiene | 80.8 | | Yes | 71 | 70 |
| Cyclohexane | 80.75 | 0.28 | Yes | 70.7 | 70 |
| Hexene | 82.8 | | Yes | 71.5 | 68.5 |
| n-Hexane | 68.95 | 0.25 | Yes | 60.6 | 28 |

As can be seen from Table I, no conventional trioxane-extracting solvent other than benzene meets the five requirements set forth hereinbefore.

It is also surprising that the apportioning coefficient K when benzene is used as the extracting solvent depends on the quantity of trioxane present in the whole of the two phases and increases therewith.

$$\left\{ K = \frac{\text{concentration of formic acid in the benzene phase in equilibrium}}{\text{concentration of formic acid in the aqueous phase in equilibrium}} \right\}$$

The trioxane would therefore seem to act as a third solvent with respect to formic acid.

Table II shows results obtained for different quantities of trioxane, the ratio by weight of benzene phase to aqueous phase being 0.75.

TABLE II

| Initial percent by weight of trioxane in the aqueous phase | 0 | 8.8 | 17.5 | 26.3 | 35 | 43.8 |
|---|---|---|---|---|---|---|
| Percent by weight of trioxane in relation to the 2 phases | 0 | 5 | 10 | 15 | 20 | 25 |
| K | 0.013 | 0.017 | 0.025 | 0.033 | 0.051 | 0.065 |

If the ratio of benzene phase to aqueous phase varies, the formic acid apportioning coefficient for the same concentration of trioxane in the initial aqueous phase will also vary, since the trioxane content varies in the whole of the two phases.

Table III shows experimental results obtained with varying ratios.

TABLE III

| Ratio: benzene phase/aqueous phase | 0.25 | 0.50 | 0.75 | 1 | 1.5 | 2 |
|---|---|---|---|---|---|---|
| Initial percent by weight of trioxane in the aqueous phase | 18 | 18 | 18 | 18 | 18 | 18 |
| Percent by weight of trioxane in relation to the 2 phases | 14.4 | 12 | 10.2 | 9 | 7.2 | 6 |
| K | 0.037 | 0.031 | 0.026 | 0.023 | 0.021 | 0.015 |

In general, therefore, the process according to the invention comprises: a reaction and distillation stage; an extraction stage, using a solvent; a solvent-separating stage; and a reconcentrating stage.

REACTION AND DISTILLATION STAGE

A concentrated aqueous solution of formaldehyde is constantly introduced into a reactor as distillation is continuously performed in the presence of a strong non-volatile acid. The resulting distillate is a mixture of formaldehyde, trioxane and water containing a small quantity of methanol and formic acid.

The initial formaldehyde solution is an aqueous solution of formaldehyde having a concentration of 40-65°, preferably 55-60%, of formaldehyde, and 3-10% of formic acid.

Strong non-volatile acids, such as sulphuric acid, benzene sulphonic acid, para-toluene sulphonic acid, and preferably para-toluene sulphonic acid, in a quantity of 2-10%, preferably 4-5%, can be used as the catalyst.

The time spent by the mixture in the reactor can be 0.5-15 hours, preferably 2-3 hours.

The resulting distillate has the following composition:

|  | Percent |
|---|---|
| Trioxane | 10-25 |
| Formic acid | 5-11 |
| Methanol | 0.05-1 |
| Formaldehyde | 30-45 |

EXTRACTION STAGE, USING SOLVENT

Benzene is used as the solvent to extract the trioxane from the resulting distillate, which is first condensed at a temperature of 40° C.

The extraction conditions are a temperature of about 30-50° C., and a ratio of solvent-to-distillate of about 0.3:1 to 2:1, preferably 1:1. A small quantity of the formic acid of the distillate passes, encouraged by the presence of trioxane, into the solvent phase.

It is a surprising feature that if the formic acid content in the charge fed to the reactor is kept as about 3-10%, the quantity of formic acid passing into the solvent phase is equal to that forming in the reactor.

Another surprising feature is that such a high content of formic acid can be maintained in the plant without detriment to the trioxane-forming reaction.

SOLVENT-SEPARATING STAGE

The trioxane is separated by continuous distillation of the formic acid-trioxane benzene extract. An azeotrope composed of formic acid and benzene is obtained at the top of the column. At a place along the column the benzene is discharged and recycled to the extractor, and the crude trioxane is discharged at the base of the column. The trioxane is redistilled in a rectifying column. The azeotrope obtained at the top of the column is washed with water until it is neutral. The organic phase is recycled to the extractor.

RECONCENTRATING STAGE

The unreacted formaldehyde remaining in the distillate from which the trioxane has been extracted is reconcentrated with a make-up quantity of formaldehyde by distillation in vacuo. A concentrated formaldehyde is obtained at the foot of the column and returned to the reactor; at the top of the column a very dilute solution of formaldehyde containing methanol is discharged. The solution is first reconcentrated at pressure to eliminate the water and methanol, whereafter the preconcentrated formaldehyde is recycled to the inlet of the concentrating column in vacuo.

A plant for the performance of the process according to the invention is illustrated in the accompanying drawing.

The concentrated formaldehyde charge is fed to a reactor 1 via a conduit 2. The distillate leaves the reactor 1 via a conduit 3, is condensed in a coil 4 and passes into a counter-current extractor 5, from which it is extracted by benzene supplied via a conduit 6.

The benzene extract passes via a conduit 7 to a distilling column 8, at the bottom of which the separated trioxane is discharged via a conduit 9, redistilled in a rectifying column 10 and recovered via a conduit 11. The formic acid-benzene azeotrope is discharged from the top of the distilling column 8 via a conduit 12 and is de-acidified by being washed with water in a tank 13. The currents of washed benzene arriving from the tank 13 and neutral benzene removed from the column 8 via a conduit 12 bis are recycled via the conduit 6 to the extractor 5.

The unreacted formaldehyde remaining in the distillate after the extraction of the trioxane is discharged from the extractor 5 via a conduit 14 and reconcentrated in vacuo in a concentrating column 15 with make-up formaldehyde supplied via a conduit 16. The concentrated formaldehyde is returned via the conduit 2 to the reactor 1. The dilute solution of formaldehyde containing methanol is discharged from the top of the concentrating column 15 and passes via a conduit 17 into a pressurised preconcentrating column 18. The preconcentrated formaldehyde passes via a conduit 19 into the concentrating column 15. The methanol is discharged at the top of the column 18 via a conduit 20 and the water is discharged at the bottom of the column 18 via a conduit 21.

The invention will now be illustrated by a number of nonlimitative examples.

Example 1

The reactor 1 is fed with a mixture containing 56.9% formaldehyde, 5% formic acid and 38.1% water. After the mixture has spent 2 hours in the reactor 1, in the presence of 5% paratoluene sulphonic acid, a distillate is obtained comprising 39.4% of formaldehyde, 38.1% water, 17.1% trioxane, 5.2% formic acid and 0.2% methanol. The mixture is condensed and extracted with benzene in the extractor 5 in the ratio of 0.72 kg. benzene per kg. of mixture. The resulting benzene extract comprises 80.3% benzene, 19.1% trioxane, 0.2% formic acid and 0.4% water. The extract is distilled in the distilling column 8. At the top of the column 8 the formic acid-benzene azeotrope is discharged, at its centre benzene and water, and at its base crude trioxane. The formic acid-benzene azeotrope is washed with water in the tank 13 and the benzene fraction is added to the benzene discharged at the centre of the column 8. The trioxane is redistilled in a rectifying column 10 to obtain a high degree of purity. The trioxane discharged from the column 10 then has only the following impurities:

|  | P.p.m. |
|---|---|
| Formic acid | <5 |
| Formene | <10 |
| Water | <30 |
| Total: methanol, other impurities, etc. | <10 |

Example 2

As in Example 1, the reactor 1 is fed with a mixture containing 56.9% formaldehyde, 40.1% water and 3% formic acid, the result being a distillate comprising 39.5% formaldehyde, 40.1% water, 17.0% trioxane, 3.2% formic acid and 0.2% methanol. The mixture is extracted by benzene at the ratio of 1.5 kg. of benzene per kg. of mixture. The result is a benzene phase formed by 11.4% trioxane, 0.14% formic acid, 0.4% water and 88% benzene. The mixture is treated as set forth an Example 1 to enable a quantity of formic acid to be eliminated equal to that forming in the reactor. After purification, the result is a trioxane of the same quality as set forth in Example 1.

Example 3

As in Example 1, the reactor 1 is fed with a mixture containing 60% formaldehyde, 30% water and 10% formic acid, the result being a distillate formed by 39% formaldehyde, 30% water, 20% trioxane, 10.5% formic acid and 0.50% methanol. The mixture is extracted with benzene, at the ratio of 1 kg. of benzene per kg. of mixture. The result is a benzene phase formed by 16.6% trioxane, 0.4% formic acid, 0.4% water and 82.6% benzene. The mixture is treated as stated hereinbefore to enable a quantity of formic acid to be eliminated equal to that forming in the reactor. After purification, the result is a trioxane of the same quality as set forth in Examples 1 and 2.

What we claim is:

1. A continuous process of preparing substantially pure trioxane, which comprises:

heating a concentrated aqueous solution of formaldehyde, containing from 3% to 10% by weight of formic acid, in the presence of a strongly acid catalyst, to form trioxane, continuously distilling the resulting aqueous mixture at 90°–92° C., condensing the distillate containing trioxane, 5% to 11% by weight of formic acid, water, unreacted formaldehyde and methanol at 40° C., continuously extracting said aqueous distillate in countercurrent flow with 0.3 to 2.0 parts of benzene per part of distillate, at a temperature of between 30° and 50° C., to obtain a solution of trioxane in benzene containing some water and formic acid, distilling said solution of trioxane to distill off benzene, water and an azeotrope of benzene-formic acid, to leave crude trioxane, distilling said crude trioxane to recover substantially pure trioxane, washing said benzene-formic acid azeotrope with water to separate the benzene and formic acid, discarding the separated formic acid, continuously reusing all of the recovered benzene to extract more aqueous distillate, distilling in vacuo the aqueous solution of formaldehyde, formic acid and methanol resulting from the extraction, to eliminate said methanol and a portion of said water in said aqueous solution, and recycling the resulting concentrated solution of formaldehyde containing formic acid into the trioxame-forming reaction together with make-up formaldehyde, whereby the formic acid content in said reaction is maintained substantially constant.

References Cited

UNITED STATES PATENTS

| 3,197,437 | 7/1965 | Wall | 260—340 |
| 3,201,419 | 8/1965 | Sennewald et al. | 260—340 |

FOREIGN PATENTS

| 970,142 | 6/1950 | France. |

NORMA S. MILESTONE, Primary Examiner